3,073,920
DIRECTION SIGNAL SWITCH
Edward L. Barcus, Anderson, Ind., assignor to General Motors Corporation, Detroit, Mich., a corporation of Delaware
Filed July 27, 1959, Ser. No. 829,834
2 Claims. (Cl. 200—61.27)

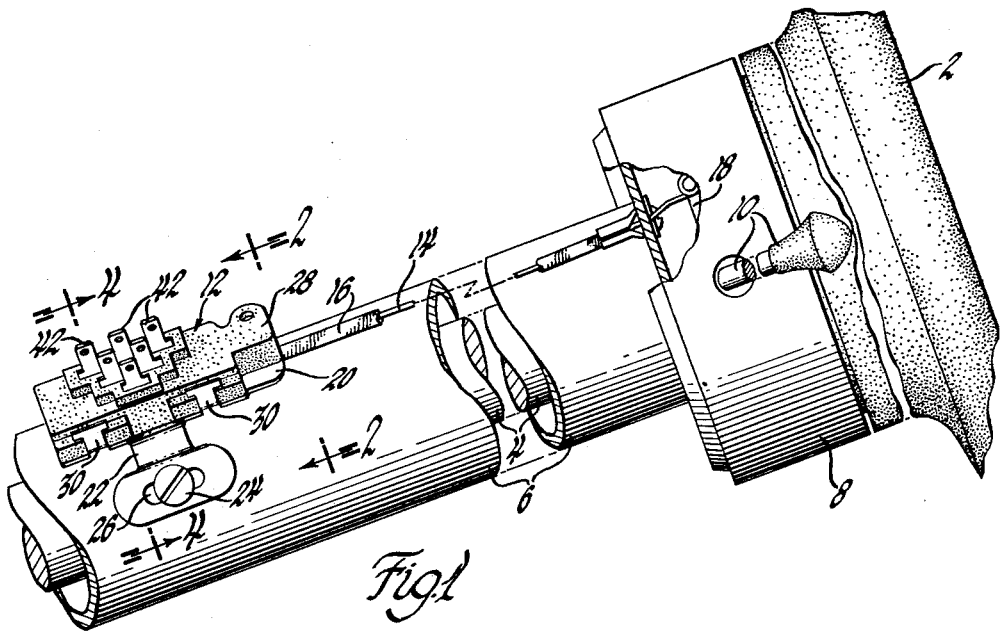
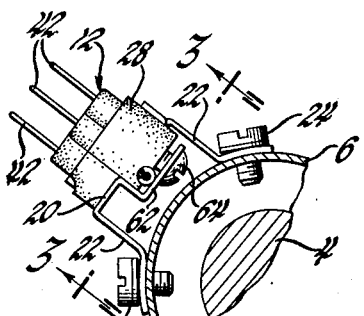
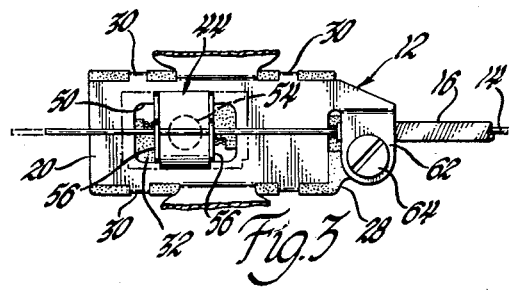
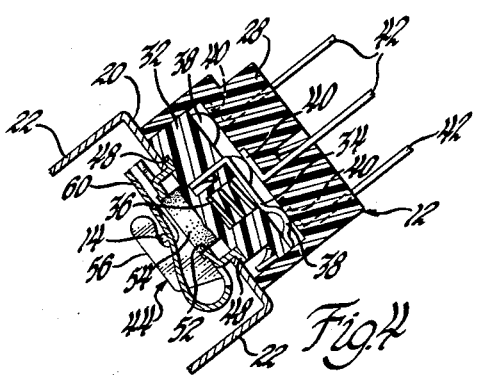
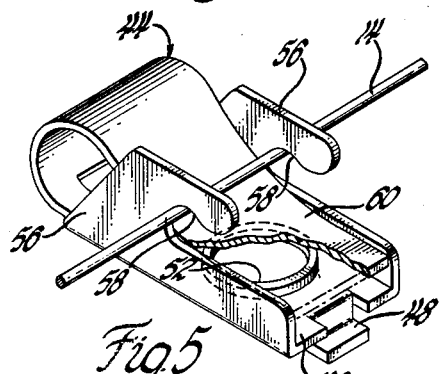
Jan. 15, 1963    E. L. BARCUS    3,073,920
DIRECTION SIGNAL SWITCH
Filed July 27, 1959
INVENTOR.
Edward L. Barcus
BY John W. Lovett
ATTORNEY ing # United States Patent Office 3,073,920
Patented Jan. 15, 1963

This invention relates generally to electrical switches and more particularly to switches of the type used in vehicle direction signal systems.

One object of the invention is to provide a connection between the switch and switch operating mechanism which facilitates the separate installation of the switch in a readily accessible location remote from the mechanism.

Another object is to provide a connection between switch and switch operating mechanism which will be self-centering and insure the proper operation of the switch in the several operating positions of the mechanism.

A further object is to provide means in the form of a spring clip to frictionally connect a switch actuating cable or wire to the movable circuit bridging member of the switch.

These and other objects and the advantages of the present invention will be apparent from the following description of the embodiment shown in the accompanying drawings.

FIG. 1 is a fragmentary side elevation of a vehicle steering column assembly with parts broken away.

FIG. 2 is an enlarged fragmentary view taken substantially on line 2—2 of FIG. 1.

FIG. 3 is a fragmentary view taken substantially on line 3—3 of FIG. 2.

FIG. 4 is an enlarged sectional view of the switch and spring clip connection taken substantially on line 4—4 of FIG. 1.

FIG. 5 is a perspective view of the spring clip showing the operating cable or wire assembled therewith.

Referring now to the drawings and particularly to FIG. 1 showing a portion of a vehicle steering column assembly, the steering wheel 2 is secured in the usual manner to the upper end of a steering shaft 4 which extends through a steering column 6. A housing 8 for the signal switch operating mechanism is disposed adjacent the upper end of the steering column 6 and is adapted to enclose a mechanism which is preferably of the type manually set by a handle or lever 10 to either of two signal operating positions on opposite sides of its neutral position and effective upon rotation of the steering wheel in a correlated direction to automatically return the mechanism to such neutral position.

The construction of the switch operating mechanism in housing 8 has not been shown herein since mechanisms of this type are well knokn in the art and the details thereof form no part of the present invention. It is, however, contemplated that the electrical switch, indicated generally at 12, which is adapted to complete the desired circuit connections in the direction signal ssytem in accordance with the positions of the operating mechanism, be disposed at a readily accessible location on the exterior of the steering column 6, as shown in FIG. 1, and be actuated by a motion translating member which extends from the switch to the operating mechanism. Such an arrangement is shown in my copending United States application Serial No. 765,091, entitled Direction Signal Mechanism, filed October 3, 1958, in which the usual bridging member of the electrical switch is actuated by means of a flexible wire extending from the switch to the operating mechanism.

The actuating means for the switch is shown in FIG. 1 as consisting of a wire 14 which is slidable within a flexible tube or sheath 16 with the wire 14 connected at its upper end to an arm 18 of a bell crank member which is adapted to be operated by the swinging movement of the usual operating ring of the mechanism in the housing 8 as shown and described in detail in my aforesaid application. As disclosed therein, the swinging movement of the operating ring in either direction from its neutral position will cause an axial movement of wire 14 in sheath 16 and the lower end of wire 14 is connected to the bridging member of the switch in the manner hereinafter described to cause a linear movement of the bridge member within a limited range to circuit control positions corresponding to the positions of the operating ring.

The electrical switch 12 includes a metal base plate 20 provided with spaced ears 22 to detachably secure the switch to the steering column 6 as by screws 24. As shown in FIG. 1, the ears 22 are formed with slots 26 to receive the screws 24 to provide for longitudinal adjustment of the switch on the steering column during the installation thereof. A switch casing 28 of insulating material is secured on the base plate 20 by bendable lugs 30 on the base plate which are received within slots in the sides of the casing.

A bridging member or slide block 32 of insulating material is slidably mounted in the casing 28 and carries metal contact plates such as the plate shown at 34 in FIG. 4. Each of the contact plates are urged outwardly from the block 32 by a spring 36 and formed with spaced contact projections 38 adapted to engage the casing 28 or spaced fixed contacts 40 in the casing which are provided with external terminals 42 for connection to the conductor leads of the turn signal circuit. Switches of this type are well known in the art and it will be understood that the contact plates 34 and fixed contacts 40 are so arranged that the plates will bridge certain of the contacts to complete the desired circuit connections as the block 32 is moved by the operating mechanism between its central or neutral position and turn signal energizing positions on either side of the neutral position.

As heretofore stated, an object of the present invention is to provide means in the form of a spring clip, indicated generally at 44, to frictionally connect the actuating wire 14 to the circuit bridging member or slide block 32 of the electrical switch 12. As shown herein, the spring clip 44 is constructed of resilient sheet metal such as spring steel with portions thereof formed to engage the slide block 32 and plate 20 and other portions thereof formed to frictionally grip the wire 14.

The spring clip 44 is provided with a base portion 46 having spaced flanged ears 48 which are adapted to extend within an elongated opening 50 in plate 20 adjacent the sides of this opening. The ears 48 are formed with oppositely directed ends which are positioned between the slide block 32 and plate 20 to secure the clip to plate 20 and permit the clip to slide longitudinally thereon, and the base portion 46 is provided with a flanged opening 52 to receive a stud 54 on the slide block 32 as shown in FIG. 4. The clip 44 is also formed to provide integral side flanges 56 having hook-shaped slots 58 which are adapted to receive the actuating wire 14, and the base portion includes an extension which is bent to form a yieldable spring arm 60 extending between the side flanges 56 in spaced relation to the base portion 46. The end of the arm 60 is spring urged away from the base portion and is adapted to be forced towards the base portion when the wire 14 is inserted within the slots 58. After the wire has been inserted in the clip 44, the tension of the spring arm 60 will be exerted to frictionally grip the wire between this arm and the side flanges 56.

It will now be apparent from the foregoing description of the construction illustrated herein that any axial movement of the actuating wire 14 within the sheath 16 which may be clamped between an ear 62 on plate 20 and the switch casing 28 by means of a screw 64 will normally cause a corresponding linear movement of the spring clip 44 and slide block 32. The movement of the spring clip 44 is, however, limited to the range indicated by the dot and dash lines in FIG. 3 by the engagement of the flanged ears 48 with the ends of the opening 50 or the abutment of the ends of the slide block 32 with the end walls of the switch casing 28.

The parts are shown in full lines in FIG. 3 in the central or neutral position of the operating mechanism and it will be understood that the slide block 32 is adapted to be moved to either side of this position in accordance with the movement of the operating mechanism to complete the desired circuit connections in the turn signal circuit. The spring clip 44 is so designed that the frictional connection thereof to the wire is such as to normally prevent any movement of the wire relative to the spring clip so any linear movement of the wire will cause a corresponding movement of the slide block 32 to its various operating positions. However, if upon initial installation of the switch and the connection of the wire 14 within the spring clip, the clip and slide block 32 are not in a position that corresponds exactly to the position of the operating mechanism, it is only necessary to move the operating mechanism by handle 10 through its several positions to cause such relative movement of the wire 14 with respect to the spring clip 44 as will result in positioning the clip in the proper position for normal operation thereafter.

If, for instance, the parts are installed and assembled so that the spring clip 44 is not in its central or neutral position when the operating mechanism is in such position, the movement of the pring clip 44 will be limited in one direction as the operating mechanism is moved through its various positions and the wire 14 will be forced to slip or slide through the clip until it reaches its normal extent of movement in that direction. Thus it will be seen that the frictional connection of the wire 14 to the slide block 32 of the switch provides a self-centering arrangement to insure the proper operation of the switch by the operating mechanism after installation and initial operation of the mechanism through its several positions.

While the embodiment of the present invention disclosed herein constitutes a preferred form, it is to be understood that various changes and modifications may be made therein and are contemplated within the scope of the following claims.

I claim:
1. A switch operating mechanism including a switch having a casing and a block slidably mounted in said casing with contacts on said casing and block adapted to be selectively engaged upon movement of said block relative to said casing, means for operating said switch including a motion translating member, and means fixed to said block and engaging said member whereby said block may be moved in response to movement of said member, the latter means being fixed with respect to said member when normal switch operating forces are applied to said member and being yieldable with respect to said member in the direction of movement of said block when abnormal forces are applied.

2. A switch operating mechanism including a switch having a casing and a block slidably mounted in said casing with contacts on said casing and block adapted to be selectively engaged upon movement of said block relative to said casing, a spring clip fixed to and movable wtih said block, means to limit the range of movement of said spring clip relative to said casing, and actuating means for said switch including a wire, said wire being frictionally engaged by said spring clip and said frictional engagement being such that movement of said wire within the limited range of movement of said spring clip will cause a corresponding movement of said block but any movement of said wire beyond said limited range will cause said wire to move relative to said spring clip.

References Cited in the file of this patent
UNITED STATES PATENTS

| | | |
|---|---|---|
| 344,110 | Johnson | June 22, 1886 |
| 1,688,182 | Fitzgerald | Oct. 16, 1928 |
| 1,721,222 | Kaminsky | July 16, 1929 |
| 1,772,982 | Brachtl | Aug. 12, 1930 |
| 2,171,073 | Winning | Aug. 29, 1939 |
| 2,863,013 | Brown et al. | Dec. 2, 1958 |
| 2,846,533 | Spicer | Aug. 5, 1958 |